(12) United States Patent        (10) Patent No.:     US 7,733,997 B2
Lai et al.                       (45) Date of Patent:      Jun. 8, 2010

(54) SIGNAL ADJUSTMENT RECEIVER CIRCUITRY

(75) Inventors: Tin H. Lai, San Jose, CA (US); Wilson Wong, San Francisco, CA (US); Sergey Shumarayev, San Leandro, CA (US); Simardeep Maangat, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 895 days.

(21) Appl. No.: 11/486,581

(22) Filed: Jul. 14, 2006

(65) Prior Publication Data

US 2007/0147478 A1    Jun. 28, 2007

Related U.S. Application Data

(63) Continuation-in-part of application No. 11/312,181, filed on Dec. 20, 2005.

(51) Int. Cl.
    *H04B 1/10*       (2006.01)
(52) U.S. Cl. .................. 375/350; 375/229; 375/232; 375/316; 375/345
(58) Field of Classification Search .............. 375/350, 375/345, 316, 229, 232
    See application file for complete search history.

(56) References Cited

U.S. PATENT DOCUMENTS

| | | | |
|---|---|---|---|
| 4,755,771 A | 7/1988 | Sakaida et al. | |
| 5,325,318 A | 6/1994 | Harris et al. | |
| 6,581,080 B1 | 6/2003 | Richards | |
| 6,819,166 B1 | 11/2004 | Choi et al. | |
| 7,065,134 B2 * | 6/2006 | Papanikolaou et al. | 375/229 |
| 7,321,612 B2 * | 1/2008 | Tonietto et al. | 375/219 |
| 7,509,103 B2 * | 3/2009 | Ozaki | 455/186.1 |
| 2005/0069057 A1 | 3/2005 | Krupka | |
| 2005/0157820 A1 | 7/2005 | Wongwirawat et al. | |

FOREIGN PATENT DOCUMENTS

EP      0 411 741     2/1991
JP       54-32049     3/1979

OTHER PUBLICATIONS

Joon-Sang Choi et. al., "A 0.18-um CMOS 3.5-Gb/s Continuous-Time Adaptive Cable Equalizer Using Enhanced Low-Frequency Gain Control Method," *IEEE Journal of Solid-State Circuits*, vol. 39, No. 3, March 2004.
Partial European Search Report, Application No. EP 06 02 3687, dated Dec. 7, 2009.
Office Action dated Jan. 7, 2010 for Japanese Application No. 2006-318128.

* cited by examiner

*Primary Examiner*—Ted M Wang
(74) *Attorney, Agent, or Firm*—Ropes & Gray LLP (57) ABSTRACT

Systems and methods for adjusting a signal received from a communication path are disclosed. A receiver can receive a signal from a communication path which attenuates at least some frequency components of the signal. The receiver can include an equalization block that adjusts at least some of the frequency content of the received signal, a signal normalization block that provides a normalized signal amplitude and/or a normalized edge slope, and a control block. In one embodiment, the control block controls frequency adjustment in the equalization block for high frequencies. For low frequency adjustment, user-programmable parameters control the normalized signal amplitude in the signal normalization block and the low frequency adjustment in the equalization block.

19 Claims, 10 Drawing Sheets

SIGNAL ADJUSTMENT RECEIVER CIRCUITRY

CROSS-REFERENCE TO RELATED APPLICATIONS

This application is a continuation-in-part of U.S. patent application Ser. No. 11/312,181, filed Dec. 20, 2005, the contents of which are hereby incorporated herein by reference in its entirety.

BACKGROUND OF THE INVENTION

This invention relates to data communication, and more particularly to methods and apparatus for automatically adjusting the circuitry involved in such communication to compensate for losses in a data signal transmitted from transmitter circuitry to receiver circuitry.

Different signal transmission media tend to have different signal transmission characteristics. For example, a cable may have a different transmission characteristic than a printed circuit board backplane. In addition, each instance of any given type of transmission medium may have somewhat different characteristics, within a range that is typical for that type of transmission medium. It is also possible for a medium's transmission characteristics to change over time or as a result of environmental or operating factors.

Among the characteristics that can adversely affect the performance of a transmission medium are attenuation and phase shift. It is common for the amount of attenuation and phase shift to be frequency-dependent. Typically, both attenuation and phase shift tend to increase with increasing frequency. For convenience herein, attenuation, phase shift, and other forms of signal degradation are sometimes referred to generically as "losses."

In order to have satisfactory transmission of a digital data signal, especially at high data rates or high frequencies, it may be necessary to compensate for losses in the signal being transmitted. Moreover, because such losses can vary from instance to instance and from time to time, it can be desirable for such compensation to be at least partly automatic or adaptive. A term that is often used for such compensation is equalization. The term pre-emphasis is also sometimes used for compensation or equalization that is performed at the transmitter, i.e., anticipating losses that will occur and compensating for them by modifying the signal before it is transmitted. When the term pre-emphasis is used, equalization may then be used as the term for compensation performed at the receiver.

Programmable circuitry such as programmable logic device ("PLD") circuitry has capabilities that can be useful in supporting adaptive equalization. For example, a PLD or PLD circuitry may be one of the components involved in transmitting or receiving a signal needing adaptive equalization, or such circuitry may be used for controlling certain aspects of the circuitry that transmits and/or receives such a signal. Such programmable circuitry (e.g., PLD circuitry) can be especially useful in implementations of this invention because programmability aids in providing different parameters and/or procedures for addressing different transmission loss characteristics that may be encountered.

SUMMARY OF THE INVENTION

The disclosed invention is a technology for adjusting a digital signal received from a communication path. A communication path may attenuate some frequency components in a digital signal, and a receiver can include circuitry to compensate for the attenuation.

A receiver can include an equalization circuit that adjusts at least some of the frequency content of a digital signal, a signal normalization circuit that converts a signal amplitude to a normalized signal amplitude and converts a signal edge slope to a normalized edge slope, and a control circuit. As used herein, the term "slope" refers generally to a rate of rise or decline between "high" and "low" signal amplitude regions. The rise and decline can be linear or non-linear. The control circuit can control the frequency content adjustment in the equalization block and/or control the normalized signal amplitude or the normalized edge slope in the signal normalization circuit.

A receiver configuration having an equalization circuit and a signal normalization circuit provides flexibility. The signal normalization parameters in a signal normalization circuit can be changed to allow a receiver to operate in different modes and to interface with different devices. A signal normalization circuit, by providing adjustable signal normalization parameters, is also capable of adjusting frequency content, much like an equalization circuit. Therefore, a receiver can also have the flexibility of apportioning frequency adjustment operations between the equalization circuit and the signal normalization circuit.

The control block can include high pass filters and low pass filters having corner frequencies. In one embodiment, the corner frequency of the low pass filters can define a boundary frequency below which frequencies are characterized as "low frequencies," and the corner frequency of the high pass filters can define a boundary frequency above which frequencies are characterized as "high frequencies."

In one aspect of the invention, the signal normalization circuit can provide a normalized signal amplitude and a normalized edge slope that are separately controllable. A signal amplitude can be representative of a particular range of lower frequency content. In one embodiment, the control circuit can control the normalized signal amplitude in the signal normalization circuit to control low frequency content adjustment. Additionally, the control circuit may not control frequency adjustment in the equalization circuit for low frequencies. In this manner, controlled adjustment of low frequency content in a received signal can be performed in the signal normalization block and not in the equalization block.

In one aspect of the invention, a control circuit can control the signal normalization circuit based on an output of the equalization circuit. For example, a signal amplitude can be representative of a particular range of lower frequency content. The signal normalization circuit, by providing a normalized signal amplitude, can thereby adjust low frequency content at the output of the signal normalization circuit. In one embodiment, the control circuit can control the normalized signal amplitude in the signal normalization circuit to cause the low frequency content at the output of the signal normalization circuit to substantially equal the low frequency content at the output of the equalization circuit.

In one aspect of the invention, a control circuit can control the equalization circuit based on an output of the signal normalization circuit. For example, an edge slope can be representative of a particular range of higher frequency content. The signal normalization block, by converting signal edge slope to a normalized edge slope, can provide a particular high frequency content at the output of the signal normalization block. In one embodiment, the control circuit can control the equalization circuit so that the high frequency content at the output of the equalization circuit is substantially equal to the high frequency content at the output of the signal normalization circuit.

In one aspect of the invention, the control block can control frequency adjustment in the equalization block for high frequencies, and user-programmable parameters can control low frequency adjustment in the equalization block and the normalized signal amplitude in the signal normalization block.

In accordance with one aspect of the disclosed technology, the control circuit can control the equalization circuit and the signal normalization circuit based on comparing the output of the equalization circuit with the output of the signal normalization circuit.

In one embodiment, the control circuit can measure the low frequency content at the output of the equalization and the low frequency content at the output of the signal normalization circuit using low pass filters. The control circuit can control the normalized signal amplitude in the signal normalization circuit to cause the low frequency contents to be substantially the same. As previously described herein, low frequency content can be defined based on a corner frequency of low pass filters in the control circuit.

In one aspect of the invention, the control circuit can measure the high frequency content at the output of the equalization and the high frequency content at the output of the signal normalization circuit using high pass filters. The control circuit can control the frequency adjustment in the equalization circuit to cause these high frequency contents to be substantially the same. As previous described herein, high frequency content can be defined based on a corner frequency of high pass filters in the control circuit.

In one aspect of the invention, the corner frequencies of the low pass filters and high pass filters in the control circuit can be predetermined or adjustable. In one embodiment, the corner frequency of the low pass filters can be adjusted based on the normalized signal amplitude of the signal normalization circuit and based on frequencies represented by the normalized signal amplitude. In one embodiment, the corner frequency of the high pass filters can be adjusted based on the normalized edge slope of the signal normalization circuit and based on frequencies represented by the normalized edge slope.

In one embodiment, the low pass filters and high pass filters can be formed by a serial connection of an adjustable resistance with an adjustable capacitance. The adjustable resistance can be a parallel, serial, and/or other arrangement of resistances and switches, and the adjustable capacitance can be a parallel, serial, and/or other arrangement of capacitances and switches. The switches can be controlled by a programmable logic device to adjust the resistances and capacitances in the filters to adjust their corner frequencies.

Further features of the invention, its nature and various advantages, will be more apparent from the accompanying drawings and the following detailed description.

DETAILED DESCRIPTION

Figure 1:
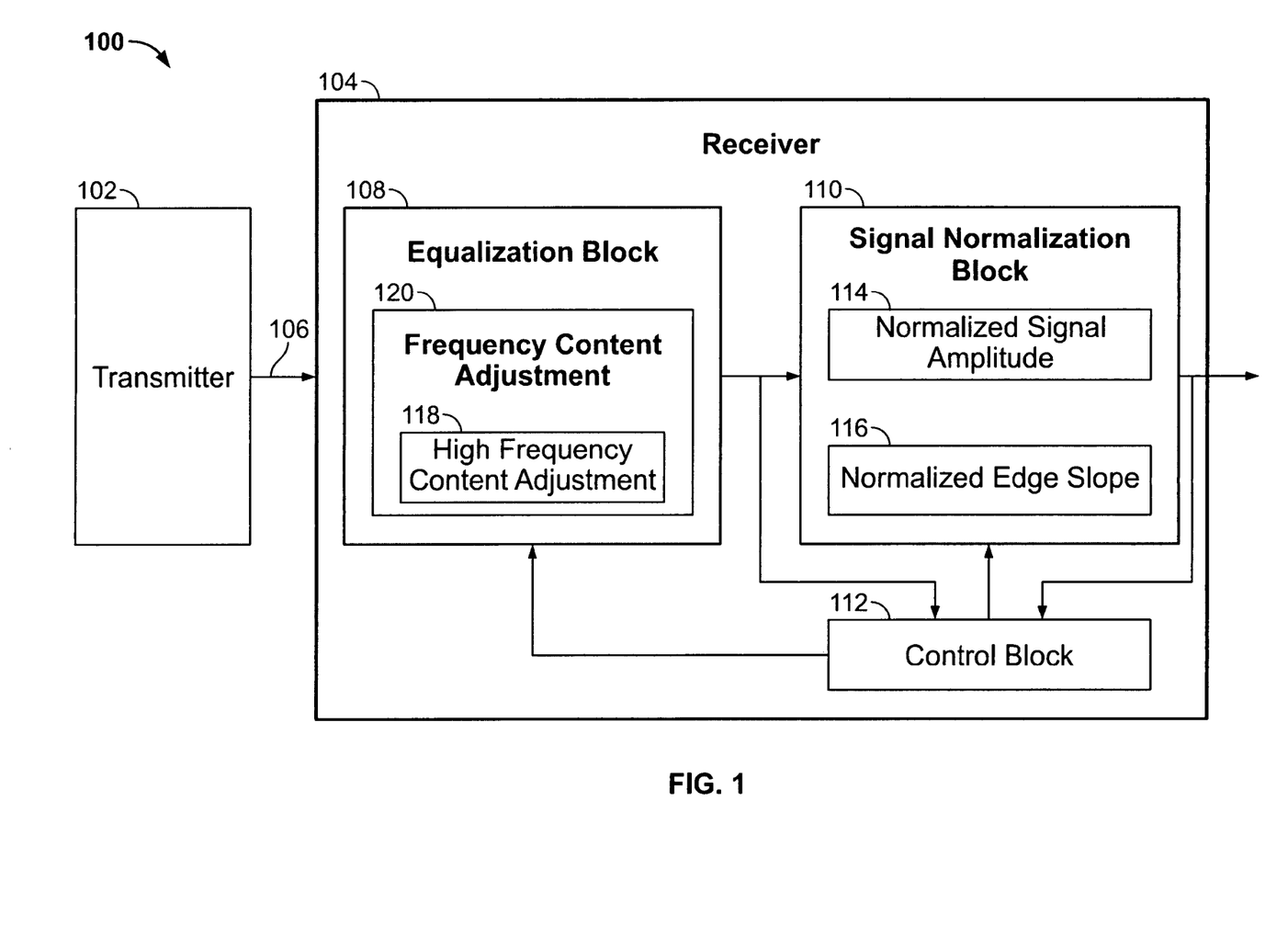
FIG. 1 is a block diagram of an exemplary communication system in accordance with one aspect of the invention.

The disclosed technology is an invention for adjusting a transmission signal at a receiver. Referring now to FIG. 1, there is shown a system 100 for communicating a signal between a transmitter 102 and a receiver 104. The communication path 106 between the transmitter 102 and the receiver 104 can include one or more communication media (e.g., wire, air, optical fiber) and/or one or more communication devices (e.g., router, hub, switch). At various points along the communication path 106, the communication path may include a digital or an analog signal. As used herein, a "digital signal" refers to a signal that represents information by using "high" and "low" signal amplitude regions and edge transitions between the two amplitude regions. Although the communication path 106 can include digital or analog signals at various points in the path, the receiver 104 of the disclosed technology receives a digital signal.

Figure 2:
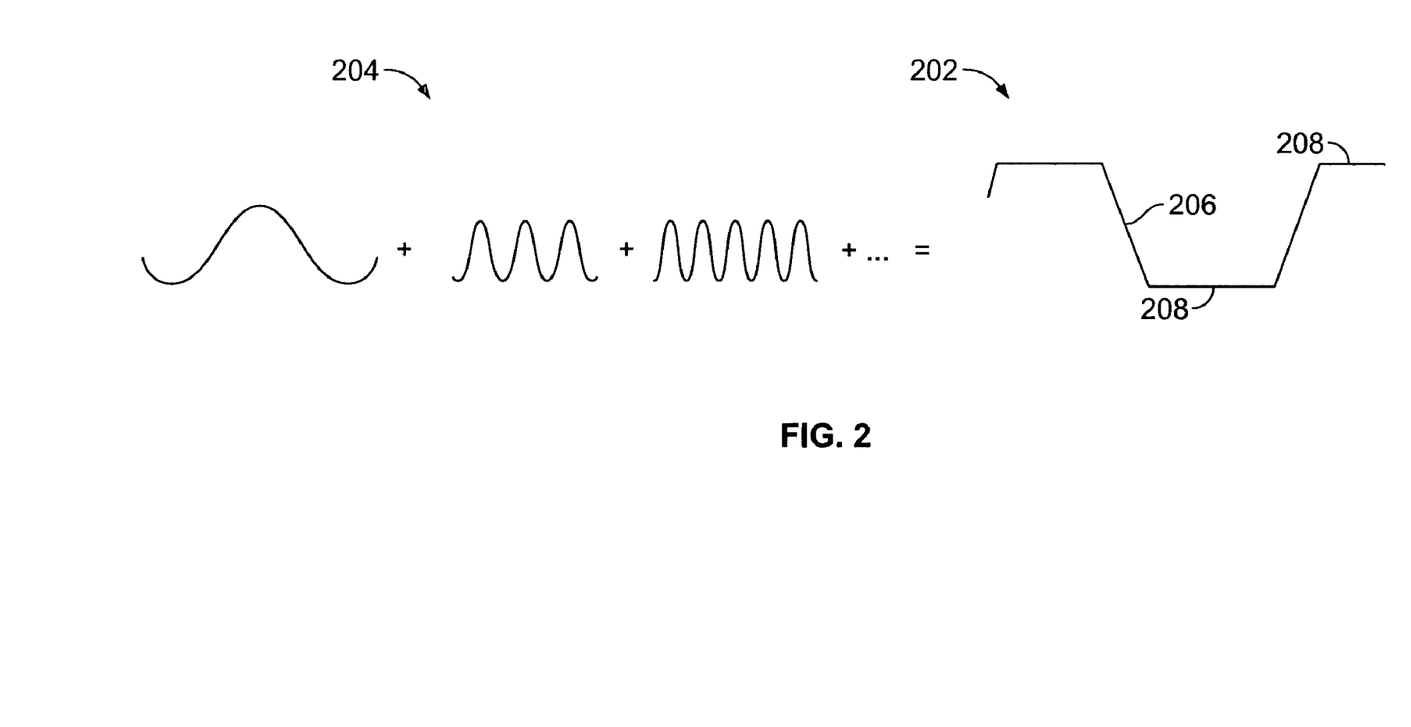
FIG. 2 is a diagram of exemplary component signals in a digital signal.

FIG. 2 shows a digital signal 202 having high and low amplitude levels and edge transitions between the two amplitude levels. Based on Fourier transforms, one skilled in the art will recognize that a digital signal 202 can include several component signals 204 that have different frequencies and amplitudes. The slope of edge transitions 206 in a digital signal can be indicative of high frequency content. As used herein, the term "slope" refers generally to a rate of rise or decline between "high" and "low" signal amplitude regions. The rise and decline can be linear or non-linear. An edge transition 206 having a greater slope can indicate a greater content of high frequency components than an edge transition having a lesser slope. The amplitude levels 208 of the digital signal can be indicative of low frequency content, such that a greater amplitude level can indicate a greater content of low frequency components than a lesser amplitude level. In one embodiment, the ranges of frequencies that are classified as "high frequencies" or "low frequencies" can be based on a boundary frequency, where high frequencies include those frequencies above the boundary frequency and low frequencies include those frequencies below the boundary frequency. In other embodiments, there can be more than one boundary frequency. For example, in one embodiment, high frequencies can include frequencies that are above a first boundary frequency, and low frequencies can include frequencies that are below a second boundary frequency. The boundary frequency or frequencies can be constant or adjustable. Boundary frequencies will be described in more detail herein in connection with FIG. 7.

Figure 3:
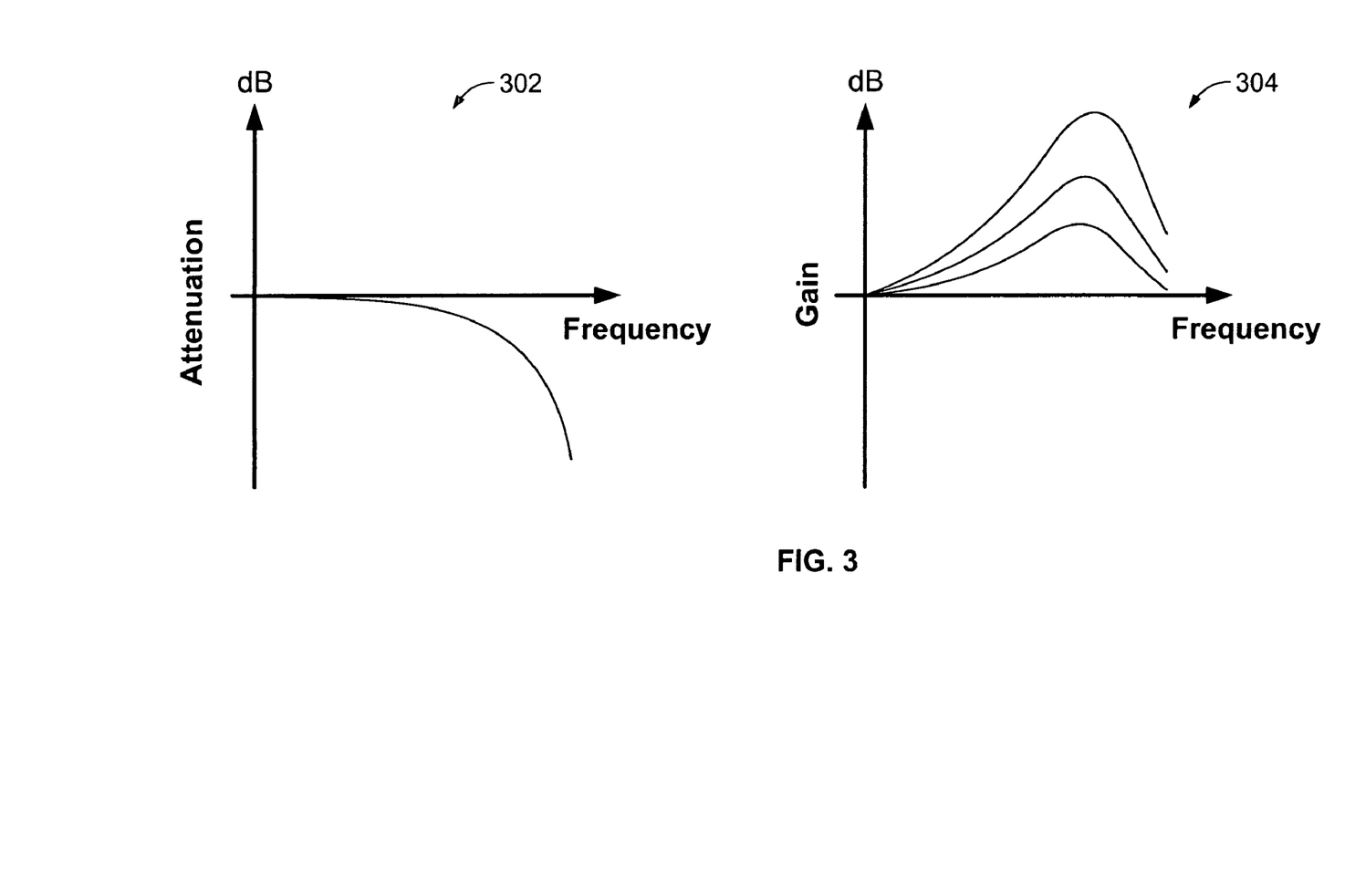
FIG. 3 is a graph diagram of exemplary attenuation and gain curves.

Referring now to FIG. 3, and with continuing reference to FIG. 1, exemplary graphs of attenuation and gain are shown. Attenuation as used herein refers to decreases in signal energy that can occur because of various phenomena in or affecting a communication system or because of filters or other circuitry or otherwise. Gain, on the other hand, refers to increases in signal energy. A signal in a communication system may experience attenuation in a communication path 106 (FIG. 1). One skilled in the art will recognize that component signals (e.g., 204, FIG. 2) that have higher frequency typically experience greater attenuation than component signals that have lower frequency, as illustrated by the exemplary attenuation graph 302 in FIG. 3. As higher frequency components in a signal become attenuated, a signal's edge transitions (e.g., 206, FIG. 2) can decrease in slope, which may undesirably affect circuit timing and/or other circuit operations.

A purpose of an equalization block 108 (FIG. 1) in a receiver is to provide gain to offset attenuation that may exist in a communication path 106. Because the attenuation effects of a communication path 106 may change over time, the equalization block 108 may need to make adjustments to adapt to the changes. The gain graph 304 in FIG. 3 shows exemplary gain curves that an equalization block 108 can provide. The determination of which gain curve best offsets the attenuation in a communication path 106 can be made by a control block 112 (FIG. 1), which will be described later herein in connection with FIG. 6. FIG. 3 is exemplary and does not limit the number, shape, and/or magnitudes of attenuation and gain curves within the scope of the invention.

Referring again to FIG. 1 and in accordance with one aspect of the disclosed invention, the illustrated receiver 104 includes an equalization block 108, a signal normalization block 110, and a control block 112. A receiver having an equalization block 108 and a signal normalization block 110 provides flexibility. The signal normalization parameters in a signal normalization block 110 can be changed to allow the receiver 104 to operate in different modes and data rates and to interface with different devices. A signal normalization block 110, by providing adjustable signal normalization parameters, is also capable of adjusting frequency content, much like an equalization block 108. Therefore, a receiver 104 can also have the flexibility of apportioning frequency adjustment operations between the equalization block 108 and the signal normalization block 110.

In general, the equalization block 108 can provide gain and/or attenuation and can adjust high frequency content specifically 118 and/or adjust frequency content in general 120. The equalization block can optionally provide low frequency content adjustment separately (not shown). Frequencies can be characterized as "high frequencies" or "low frequencies" based on one or more boundary frequencies, which will be described in more detail in connection with FIG. 6. In one embodiment, the equalization block 108 can adjust the frequency content of a digital signal received from the communication path 106 according to a gain curve (e.g., 304, FIG. 3) to provide a resulting post-equalization signal. One skilled in the art will recognize that various existing technologies for adjusting frequency content can be used in the equalization block 108. The equalization block 108 can be controlled by the control block 112, which will be described later herein in connection with FIG. 6.

In accordance with one aspect of the invention, a post-equalization signal is communicated to the signal normalization block 110, which can convert the amplitude and/or the edge slope in the post-equalization signal to a normalized amplitude and/or a normalized edge slope, respectively. In one embodiment, the signal normalization block 110 can provide a normalized signal amplitude 114 and/or a normalized edge slope 116 based on industry standards, government regulations, and/or other requirements. Generally, because a receiver 104 and a transmitter 102 are designed to work together, the receiver 104 can know the signal amplitudes (e.g., 208, FIG. 2) and slope of edge transitions (e.g., 206, FIG. 2) used by a transmitter 102. Therefore, the signal normalization block 110 in the receiver 104 can provide a normalized signal amplitude 114 and/or a normalized edge slope 116 that is the same as those used by the transmitter 102 for providing a digital transmission signal.

In one embodiment, the signal normalization block 110 can provide a normalized signal amplitude 114 and a normalized signal edge slope 116 based on the operating requirements of a particular application. For example, a digital signal received by a receiver 104 may be intended for use by multiple devices that have different voltage requirements. One device may require a normalized signal amplitude of 600 mV, for example, and another device may require a normalized signal amplitude of 1200 mV, for example. Depending on which device may be interacting with the receiver 104, the control circuit 112 can change the normalized signal amplitude 114 accordingly. As another example, a transmitter 102 and a receiver 104 may have different modes of operation that use different transmission frequencies. If a digital signal communicated between the transmitter 102 and receiver 104 has a signal frequency of one megabit/second, a normalized edge slope of one nanosecond may be appropriate. However, if the digital signal has a signal frequency of ten gigabits/second, a normalized edge slope of one nanosecond may be too slow and the control circuit 112 may need to increase the normalized edge slope 116. Accordingly, in some embodiments, the normalized signal amplitude 114 and/or the normalized edge slope 116 in the signal normalization block 110 can be adjustable and can be controlled by a control block 112.

Figure 4:
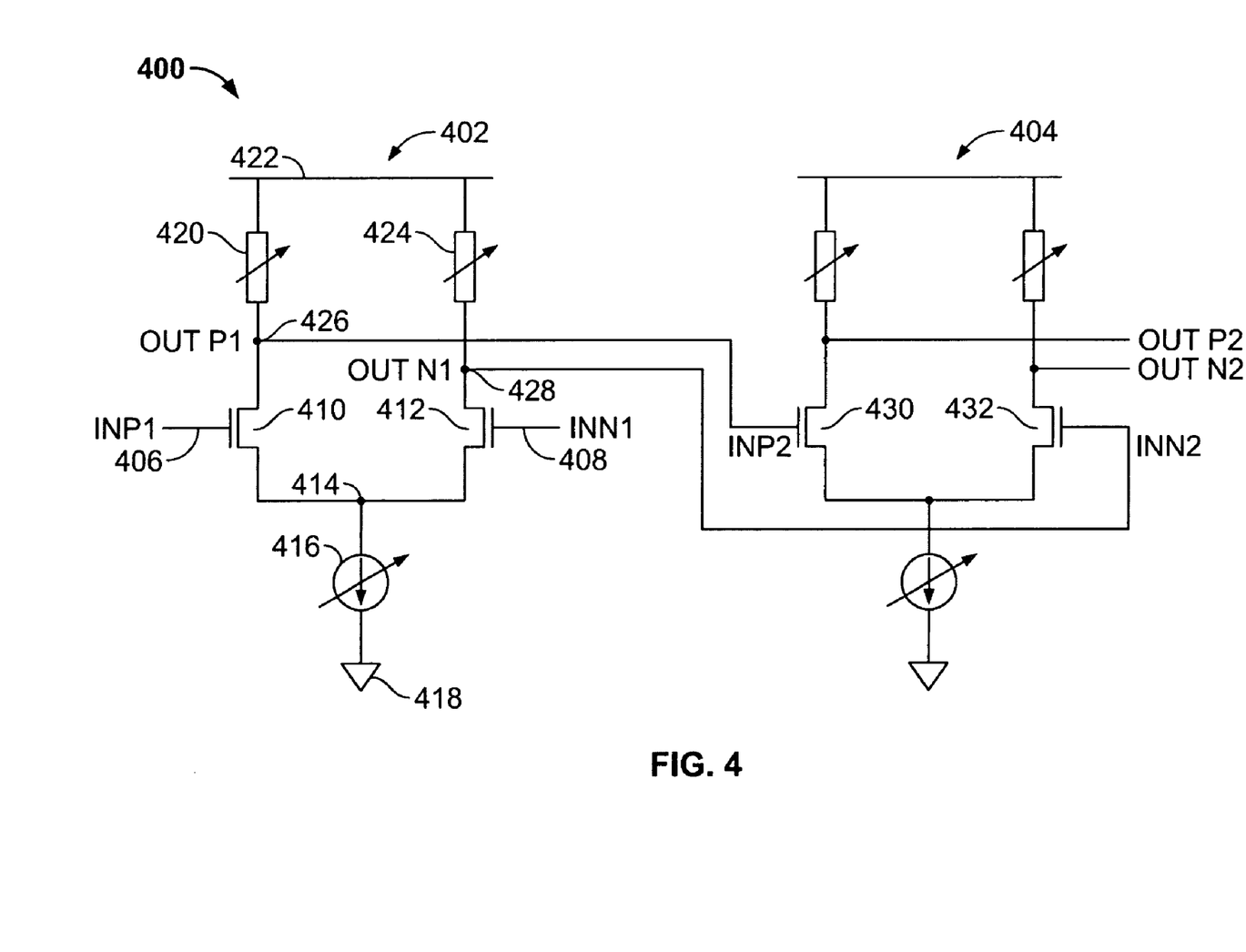
FIG. 4 is a circuit diagram of one embodiment of the signal normalization block of FIG. 1.

FIG. 4 shows a circuit embodiment of the signal normalization block of FIG. 1. The illustrated signal normalization circuit 400 includes at least two stages 402, 404. The first stage 402 has connections INP1 406 and INN1 408 for receiving a post-equalization signal. If the post-equalization signal is a differential signal, then both the INP1 and INN1 connections 406, 408 can be used to receive the post-equalization signal. If the post-equalization is a single-ended signal, then the INP1 connection 406 can be used to receive the post-equalization signal while the INN1 connection 408 can be connected to a reference voltage, or vice versa. For ease of explanation, it will be assumed that the post-equalization signal is a differential signal that can have a "high" value and a "low" value. When the post-equalization signal is "high," the INP1 signal 406 is greater than the INN1 signal 408, and when the post-equalization is "low," the INP1 signal 406 is less than the INN1 signal 408.

The INP1 connection 406 is connected to the gate of an INP1 field effect transistor (FET) 410, and the INN1 connection 408 is connected to the gate of an INN1 FET 412. It will be assumed herein that when the differential signal is "high," the INP1 FET 410 will be ON and the INN1 FET 412 will be OFF, and when the differential signal is "low," the INP1 FET 410 will be OFF and the INN1 FET 412 will be ON. The source node of the INP1 FET and the source node of the INN1 FET are connected to each other 414, and both are connected to one node of a variable current source 416. The other node of the variable current source is connected to a low reference voltage 418. The drain node of the INP1 FET 410 is connected to one node of an INP1 variable resistance 420, and the other node of the INP1 variable resistance 420 is connected to a high reference voltage 422. Similarly, the drain node of the INN1 FET 412 is connected to one node of an INN1 variable resistance 424, and the other node of the INN1 variable resistance 424 is connected to the high reference voltage 422.

The drain node of the INP1 FET 410 will be referred to herein as OUTP1 426, and the drain node of the INN1 FET 412 will be referred to herein as OUTN1 428. The voltage difference between the OUTP1 and OUTN1 nodes 426, 428 is a differential signal that is the output of the first stage 402. The output differential signal can be defined by either (OUTP1−OUTN1) or (OUTN1−OUTP1). For ease of explanation, it will be assumed from this point on that the output of the first stage is defined by (OUTP1−OUTN1). Additionally, OUTP1 426 is connected to the gate node of an INP2 FET 430 in the second stage 404, and OUTN1 428 is connected to the gate node of an INN 2 FET 432 in the second stage 404.

Referring to the first stage 402, when the post-equalization signal has a "high" value, the INP1 FET 410 is ON and the INN1 FET 412 is OFF. When the INN1 FET 412 is OFF, OUTN1 428 has the same voltage as the high reference voltage $V_H$ 422. When the INP1 FET 410 is ON and the INN1 FET 412 is OFF, the current I established by the variable current source 416 flows through the INP1 FET 410 and the INP1 variable resistance $R_{INP1}$ 420. Thus, the voltage at OUTP1 426 is $(V_H - I^*R_{INP1})$. Accordingly, when the post-equalization has a "high" value, the output of the first stage is (OUTP1−OUTN1)=$(V_H - I^*R_{INP1}) - V_H = -I^*R_{INP1}$. When the post-equalization has a "low" value, the INP1 FET 410 is OFF and the INN1 FET 412 is ON. When the INP1 FET 410 is OFF, OUTP1 426 has the same voltage as the high reference voltage $V_H$ 422. When the INN1 FET 412 is ON and the INP1 FET 410 is OFF, the current I established by the variable current source 416 flows through the INN1 FET 412 and the INN1 variable resistance $R_{INN1}$ 424. Thus, the voltage at OUTN1 428 is $(V_H - I^*R_{INN1})$. Accordingly, when the post-equalization has a "low" value, the output of the first stage is (OUTP1−OUTN1)=$V_H - (V_H - I^*R_{INN1}) = +I^*R_{INN1}$. By this operation, it can be seen that as the post-equalization signal varies between "high" and "low" values, the output of the first stage 402 will vary between $-I^*R_{INP1}$ and $+I^*R_{INN1}$, which are normalized signal amplitudes. Therefore, in the illustrated embodiment of FIG. 4, the signal normalization circuit 400 can adjust the normalized signal amplitude (114, FIG. 1) by changing the amount of current I established by the variable current source 416 and/or by changing the resistances $R_{INP1}$ and $R_{INN1}$ of the variable resistances 420, 424.

The output nodes OUTP1 and OUTN1 426, 428 are connected to the gate nodes of FETs 430, 432 in the second stage 404. Because the gate nodes of these FETs 430, 432 have gate capacitances, the variable resistances 420, 424 in the first stage 402 and the gate capacitances in the second stage 404 together form RC circuits that have RC time constants. The RC circuits cause the voltages at nodes OUTP1 and OUTN1 426, 428 to rise and decline exponentially based on the RC time constants, thereby defining a normalized edge slope in the output signal (OUTP1−OUTN1). The RC time constants can be adjusted by changing the resistances $R_{INP1}$ and $R_{INN1}$ 420, 424. This adjustment changes the slope of edge transitions in OUTP1 426 and OUTN1 428, and, as a consequence, the slope of edge transitions in the output signal (OUTP1−OUTN1) is also adjusted. Therefore, in the illustrated embodiment of FIG. 4, the signal normalization circuit 400 can provide a particular normalized edge slope (116, FIG. 1) by adjusting the resistances $R_{INP1}$ and $R_{INN1}$ of the variable resistances 420, 424.

In the illustrated embodiment of FIG. 4, the second stage 404 is the same as the first stage 402. The second stage 404 receives a differential signal via the input nodes INP2 426 and INN2 428 and provides a differential output signal (OUTP2−OUTN2). The output of the second stage 404 can be connected to the input of yet another stage or can be connected to the output of the signal normalization circuit.

Figure 5:
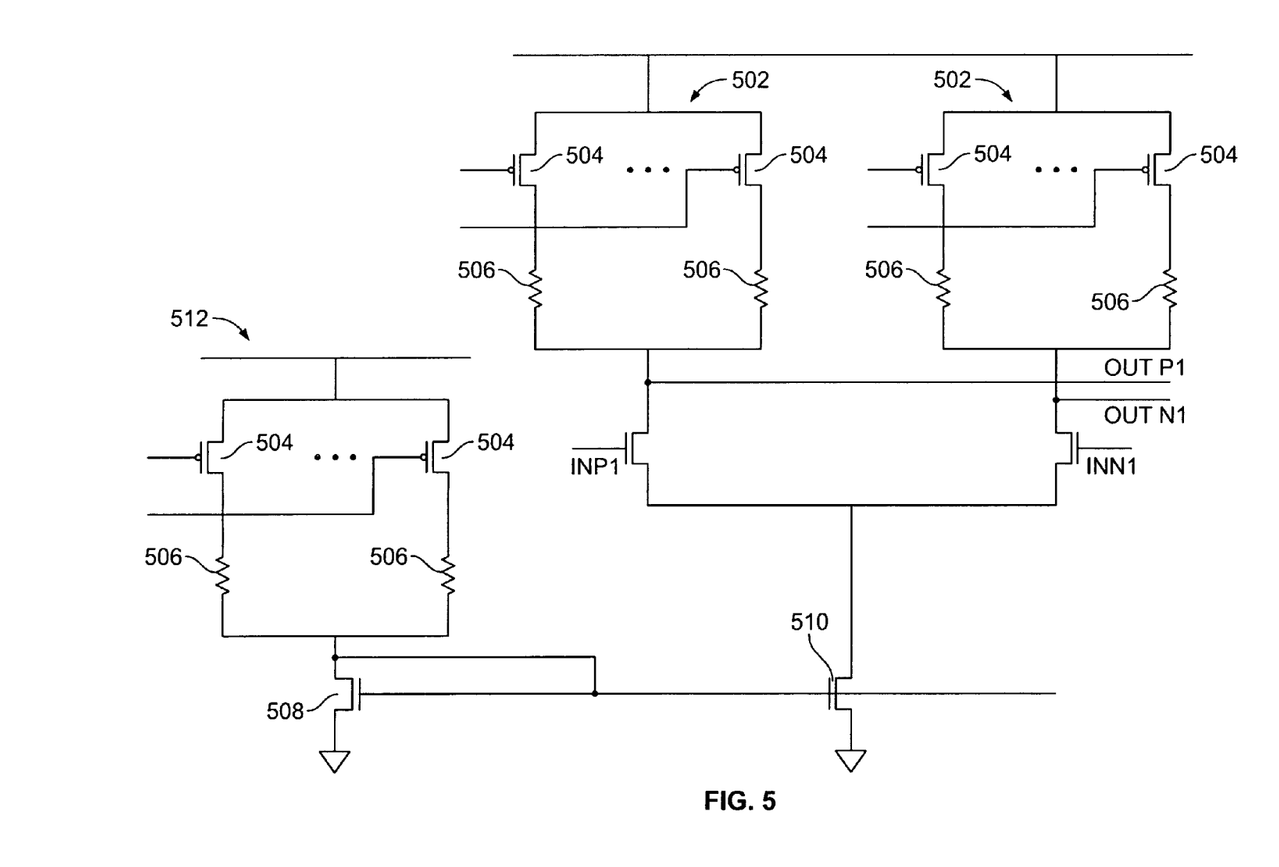
FIG. 5 is a circuit diagram of one embodiment of a stage in the signal normalization circuit of FIG. 4.

FIG. 5 shows an embodiment of one stage of the signal normalization circuit of FIG. 4 in which circuit implementations of a variable resistance and a variable current source are shown. In general, a variable resistance can be implemented by a serial, parallel, and/or other arrangement of switches and resistances. FIG. 5 shows a parallel arrangement of resistances 502 in which each branch of the parallel arrangement can be included or excluded by closing or opening a switch 504. In one embodiment, the resistances 506 in each branch can have substantially the same values. In another embodiment, two or more resistances 506 in the arrangement 502 can have substantially different values. Although the switches 504 are illustrated as p-channel field effect transistors, other types of devices or circuits can be used to provide switching capability. The illustrated variable resistance circuit 502 does not limit the scope of the invention and other arrangements and/or types of switches and resistances can be used. The switches 504 can be operated by a programmable logic device ("PLD"), which will be described later herein in connection with FIG. 9.

In the illustrated embodiment of FIG. 5, the variable current source 416 of FIG. 4 is implemented using a current mirror circuit. Although a current mirror circuit and its operation will be understood by one skilled in the art, a brief description is provided here. In the current mirror circuit, a reference current can be established to flow through a reference-side FET 508. The gate and drain nodes of the reference-side FET 508 can be connected to each other, and the gate node of the reference-side FET 508 is also connected to the gate node of a "mirroring" FET 510. By this configuration, a mirror current can be established to flow through the mirroring FET 510. The amount of mirror current flowing through the mirroring FET 510 may or may not be the same as the amount of reference current flowing through the reference-side FET 508. The relationship between a mirror current and a reference current can depend upon the sizes of the reference-side FET 508 and the mirroring FET 510, among other things. When the reference current changes, the mirror current changes correspondingly based on the relationship. Each stage (e.g., 402, 404, FIG. 4) of the signal normalization circuit 400 of FIG. 4 can include a mirroring FET whose gate node is connected to the gate node of the reference-side FET 508. The size of each mirroring FET (e.g., 510) can determine the relationship of the mirror current in each stage to the reference current.

In the illustrated embodiment of FIG. 5, the reference current can be established by using a variable resistance 512. As previously described herein, a variable resistance 512 can be implemented by an arrangement of resistances 506 and switches 504. The switches 504 in the variable resistance 512 can be controlled by a programmable logic device (not shown). The illustrated implementation of a variable current source is exemplary and does not limit the scope of the invention. The current mirror circuit can include bi-junction transistors rather than field effect transistors. In another embodiment, a circuit other than a current mirror can be used to provide a current source.

Referring again to FIG. 1, the operation of the control block 112 in the receiver 104 will now be described. A control block 112 in the receiver 104 can control various operations in the equalization block 108 and in the signal normalization block 110. In general, the equalization block 108 can provide gain and/or attenuation and can adjust high frequency content specifically 118 and/or can adjust frequency content generally 120. The control block 112 can control the amount of gain or attenuation provided by the equalization block 108. In one embodiment, the control block 112 can control the general adjustment of frequency content 120 in equalization block 108. In one embodiment, the control block 112 can control only high frequency adjustment 118 in the equalization block 108. The equalization block can optionally provide low frequency content adjustment separately (not shown). The control block 112 may or may not control this low frequency content adjustment. The signal normalization block 110 can in general provide a normalized signal amplitude 114 and/or a normalized edge slope 116. In one embodiment, the control block 112 can control both the normalized signal amplitude 114 and the normalized edge slope 116. In one embodiment, the control block 112 can control only the normalized signal amplitude 114 or only the normalized edge slope 116, but not both.

As shown in FIG. 1, the control block 112 can receive a post-equalization signal at the output of the equalization block 108 and a normalized signal at the output of the signal normalization block 110. The control block 112 can control operations in the equalization block 108 and in the signal normalization block 110 based on these output signals. In this manner, the equalization block 108, the signal normalization block 110, and the control block 112 together form a feedback loop. The operation of the feedback loop can vary depending on the particular device or application in which the receiver 104 is used. One example is shown in FIG. 6.

Figure 6:
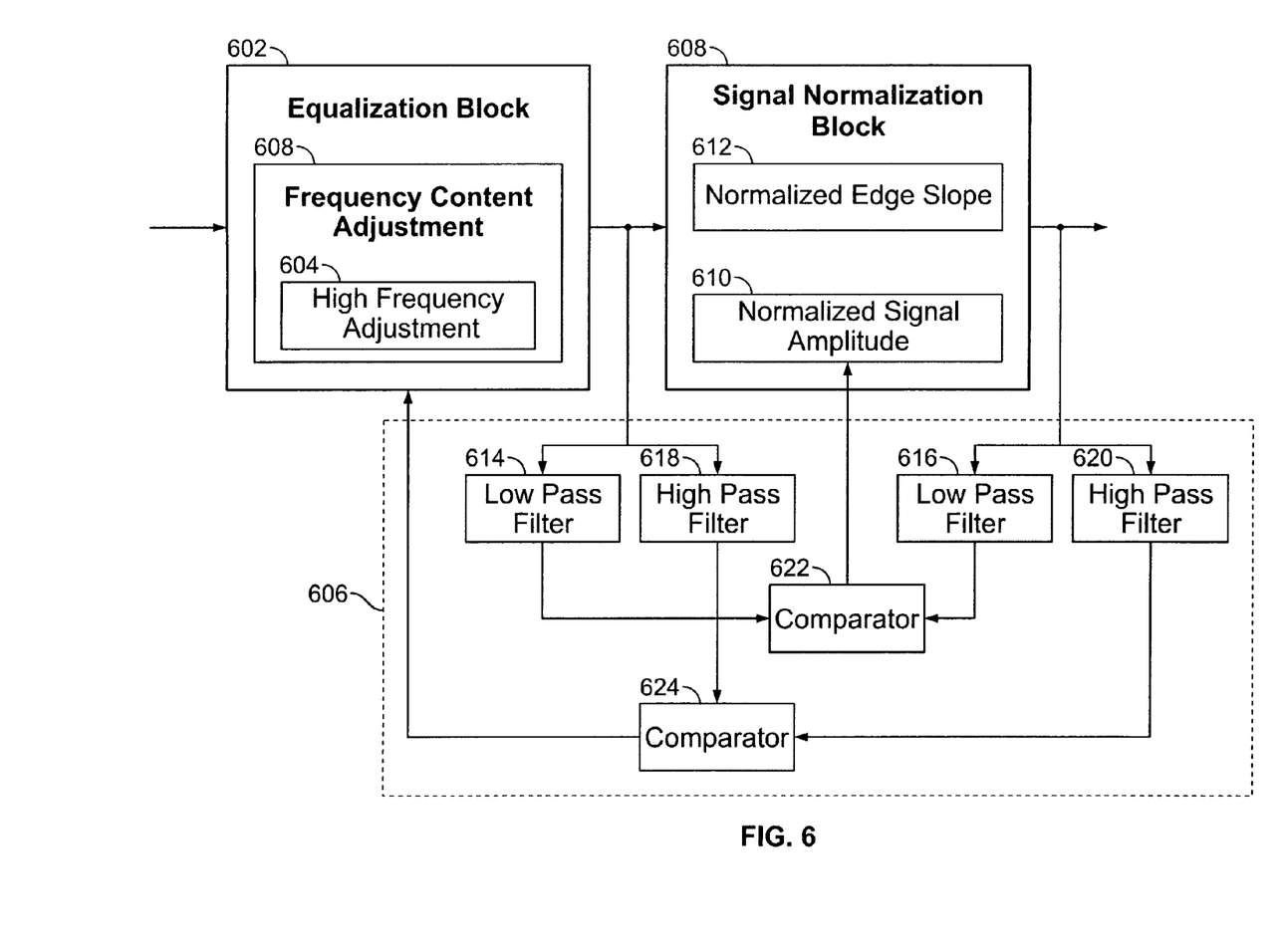
FIG. 6 is a block diagram of one exemplary control arrangement in the receiver of FIG. 1.

FIG. 6 shows one embodiment of the receiver 104 of FIG. 1 in which controlled low frequency adjustment is provided in the signal normalization block. In the equalization block 602, the high frequency adjustment 604 and/or a general frequency content adjustment 608 can be controlled by the control block 606. If the equalization block 602 provides separate low frequency adjustment (not shown), the separate low frequency adjustment is not controlled by the control block 606. In the signal normalization block 608, the normalized signal amplitude 610 is controlled by the control block 606. The signal normalization block 608 can provide a normalized edge slope 612 that may or may not be controlled by the control block 606. In this configuration, controlled low frequency adjustment is provided in the signal normalization block 608 (by way of the normalized signal amplitude 610), and separate low frequency adjustment in the equalization block, if any, is not controlled. Benefits of using this configuration include, but are not limited to, simplifying the operation of the equalization block 602 and/or achieving greater gain for high frequency component signals relative to low frequency component signals in the equalization block 602.

In the illustrated embodiment, the control block 606 includes high and low pass filters 614-620. In one embodiment, a corner frequency for a low pass filter 614, 616 can be a frequency below which the low pass filter provides substantially no attenuation and above which the low pass filter provides attenuation. Similarly, a corner frequency for a high pass filter 618, 620 can be a frequency above which the high pass filter provides substantially no attenuation and below which the high pass filter provides attenuation. Attenuation can occur at different rates, such as a rate of decline of 20 dB/decade, for example, or a rate of decline of more than 20 dB/decade. The corner frequencies for a high pass filter 618, 620 and a low pass filter 614, 616 can be the same or substantially the same frequency or can be substantially different frequencies. The corner frequencies of the high and low pass filters 614-620 can be constant or adjustable.

In one embodiment, a corner frequency can correspond to a boundary frequency that defines which frequencies are categorized as "high frequencies" and which frequencies are categorized as "low frequencies." For example, a corner frequency for a low pass filter 614, 616 can be the frequency below which frequencies are characterized as "low frequencies." Similarly, a corner frequency for a high pass filter 618, 620 can be the frequency above which frequencies are characterized as "high frequencies."

In one embodiment, corner frequencies for the high and low pass filters 614-620 can be predetermined and may not be changed or may not be adjustable. In one embodiment, the corner frequencies for the high and low pass filters 614-620 can be adjustable and can, for example, be adjusted based on a normalized signal amplitude 610 or a normalized edge slope 612. As previously described herein, a normalized signal amplitude 610 can be representative of a particular range of lower frequencies, and a normalized edge slope 612 of a signal normalization block 608 can represent a particular range of higher frequencies. In one embodiment, the corner frequency for a low pass filter 614, 616 can be adjusted based on a normalized signal amplitude 610. The corner frequency of a low pass filter 614, 616 can be chosen so that a substantial portion of the frequency content represented by the normalized signal amplitude 610 is below the corner frequency. In this manner, a normalized signal amplitude 610 can determine the range of frequencies that is categorized as "low frequencies." In one embodiment, the corner frequency for a high pass filter 618, 620 can be based on a normalized edge slope 612. For example, the corner frequency of a high pass filter 618, 620 can be adjusted so that a substantial portion of the frequency content represented by the normalized edge slope 612 is above the corner frequency. In this manner, a normalized edge slope 612 can determine the range of frequencies that is categorized as "high frequencies." Adjustable corner frequencies will be described in more detail herein in connection with FIGS. 7-9.

In the illustrated embodiment of FIG. 6, the control block 606 includes a first low pass filter 614 that provides the low frequency content of a post-equalization signal and a second low pass filter 616 that provides the low frequency content of a normalized signal. A low frequency content comparator 622 compares the outputs of the two low pass filters 614, 616. In one embodiment, the low frequency content comparator 622 can measure the energy levels of the outputs of the low pass filters 614, 616 and can adjust the normalized signal amplitude 610 in the signal normalization block 608 in a way that substantially equalizes the energy levels. By this operation, the normalized signal amplitude 610 of the signal normalization block 608 can be controlled to substantially equalize the low frequency content of the normalized signal and the low frequency content of the post-equalization signal. Therefore, this operation may assume that low frequency content is not attenuated by a communication path (106, FIG. 1) or is only attenuated in a manner that does not necessitate compensation.

The illustrated control block 606 also includes a first high pass filter 618 that provide the high frequency content of a post-equalization signal and a second high pass filter 620 that provides the high frequency content of a normalized signal. A high frequency content comparator 624 compares the outputs of the two high pass filters 618, 620. In one embodiment, the high frequency content comparator 624 can measure the energy levels of the outputs of the high pass filters 618, 620 and can control the equalization block 602 in a way that substantially equalizes the energy levels. By this operation, the frequency content adjustment 608 and/or high frequency adjustment 604 in the equalization block 602 can be adjusted to substantially equalize the high frequency content in the post-equalization signal and the high frequency content in the normalized signal.

A comparator 622, 624 in the control block 606 can be implemented in various ways. In one embodiment, a comparator 622, 624 can include circuitry for measuring the energy level of a signal. A comparator 622, 624 can include circuitry for rectifying the outputs of the filters. The rectified signals can be compared by an error amplifier, such as an operational amplifier circuit, and the error amplifier can produce a control signal based on the comparison. In one embodiment, the error amplifier can produce an analog control signal. In one embodiment, the analog control signal can be converted into a digital signal by an analog-to-digital converter, or the error amplifier can produce a digital control signal. In one embodiment, the digital signal can be communicated to a programmable logic device (PLD). Use of a PLD for control operations will be described herein in connection with FIG. 9. The embodiments described herein are exemplary and are not limiting. One skilled in the art will recognize that various circuits exist for implementing the comparator capabilities described herein.

Figure 7:
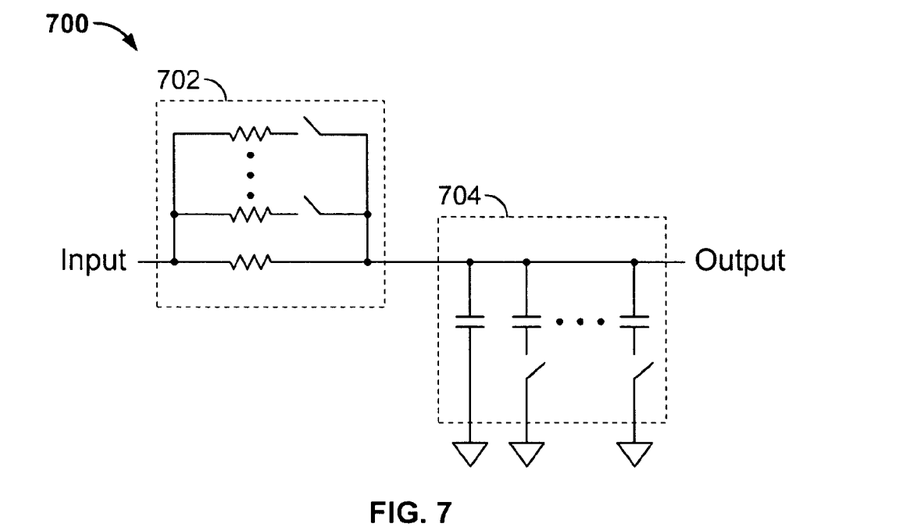
FIG. 7 is a circuit diagram of an exemplary low pass filter.
Figure 8:
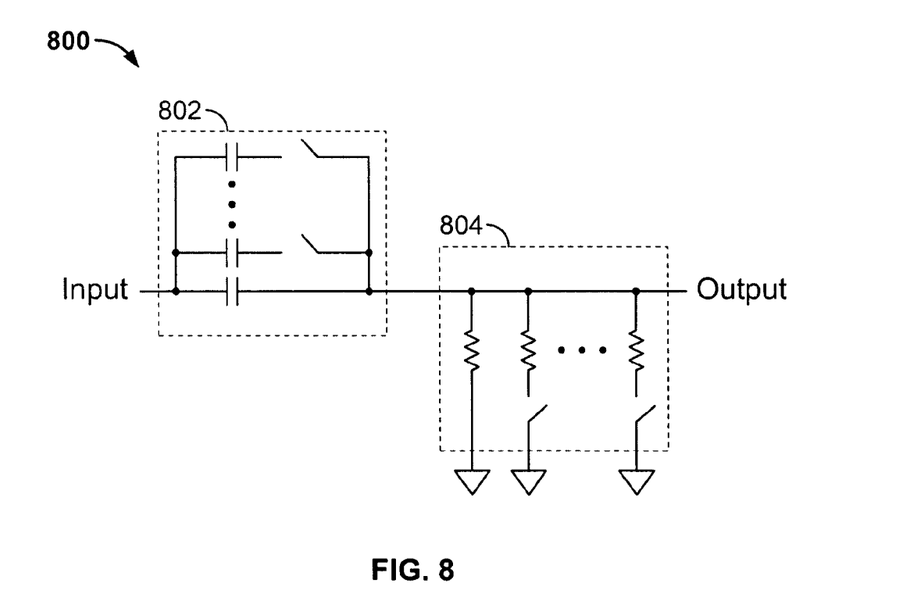
FIG. 8 is a circuit diagram of an exemplary high pass filter.

Referring now to FIG. 7, there is shown one embodiment of a low pass filter 700 that includes an adjustable resistance 702 connected to an adjustable capacitance 704. Similarly, FIG. 8 shows one embodiment of a high pass filter 800 that includes an adjustable capacitance 802 connected to an adjustable resistance 804. An adjustable resistance 702, 804 can be implemented using a parallel, series, and/or other arrangement of resistances and switches, and an adjustable capacitance 704, 802 can be implemented using a parallel, series, and/or other arrangement of capacitances and switches. The switches can be opened or closed by a programmable logic device (not shown) to provide a desired resistance and/or a desired capacitance. By adjusting the resistance and/or capacitance, the corner frequencies of the filters 700, 800 in FIGS. 7-8 can be changed.

Figure 9:
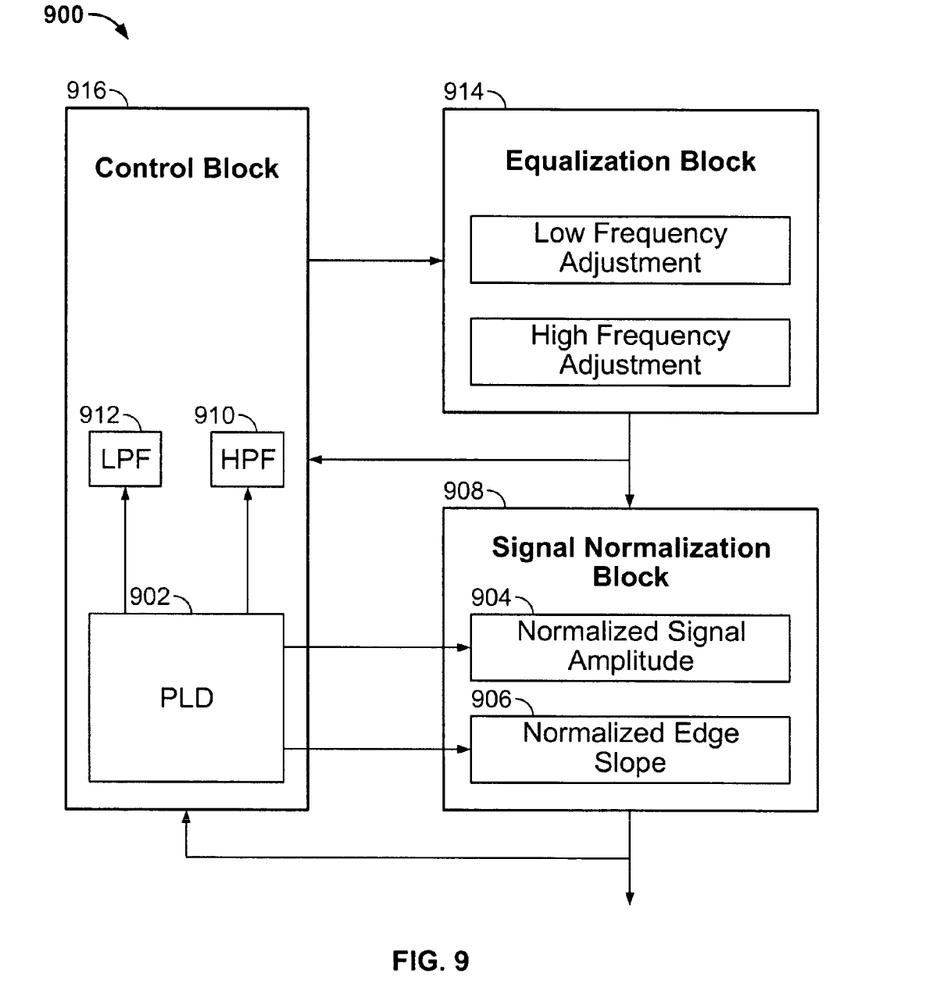
FIG. 9 is a block diagram of one embodiment of a receiver that includes a programmable logic device.

FIG. 9 shows one embodiment of the control block 112 of FIG. 1 (and also control block 606 of FIG. 6) in which a programmable logic device (PLD) 902 can be used to perform control operations. A PLD 902 can be connected to switches in an adjustable resistance or an adjustable capacitance, such as those shown in FIG. 5 and in FIGS. 7-8, and can be programmed to adjust the resistances and/or capacitances. For example, in connection with FIG. 5, the PLD 902 can be programmed to adjust the resistances 502 connected to output nodes OUTP1 and OUTN1 to provide a normalized edge slope. The PLD can also be programmed to adjust the resistance 512 in the current mirror to provide a normalized signal amplitude. As another example, in connection with FIGS. 7-8, the PLD 802 can be programmed to adjust the resistances 702, 804 and/or capacitances 704, 802 in the filters 700, 800 to provide desired corner frequencies. In one embodiment, when a PLD 902 changes the normalized edge slope 904 and/or the normalized signal amplitude 906 in the signal normalization block 908, the PLD 902 can also change the corner frequencies of the high and low pass filters 910, 912 in the control block accordingly. The PLD 902 or another component in the control block 916 can control the frequency content adjustment in the equalization block 914 based on the corner frequencies of the filters 910, 912 in the control block 916.

Although the PLD 902 of FIG. 9 is shown to be part of the control block 916, the control block 916 may only utilize a portion of the PLD resources so that the PLD 902 can be used for other purposes as well. Accordingly, the PLD 902 need not be physically part of the control block 916. FIG. 9 is exemplary and other arrangements and numbers of circuit components can be used to provide the capabilities described herein.

Figure 10:
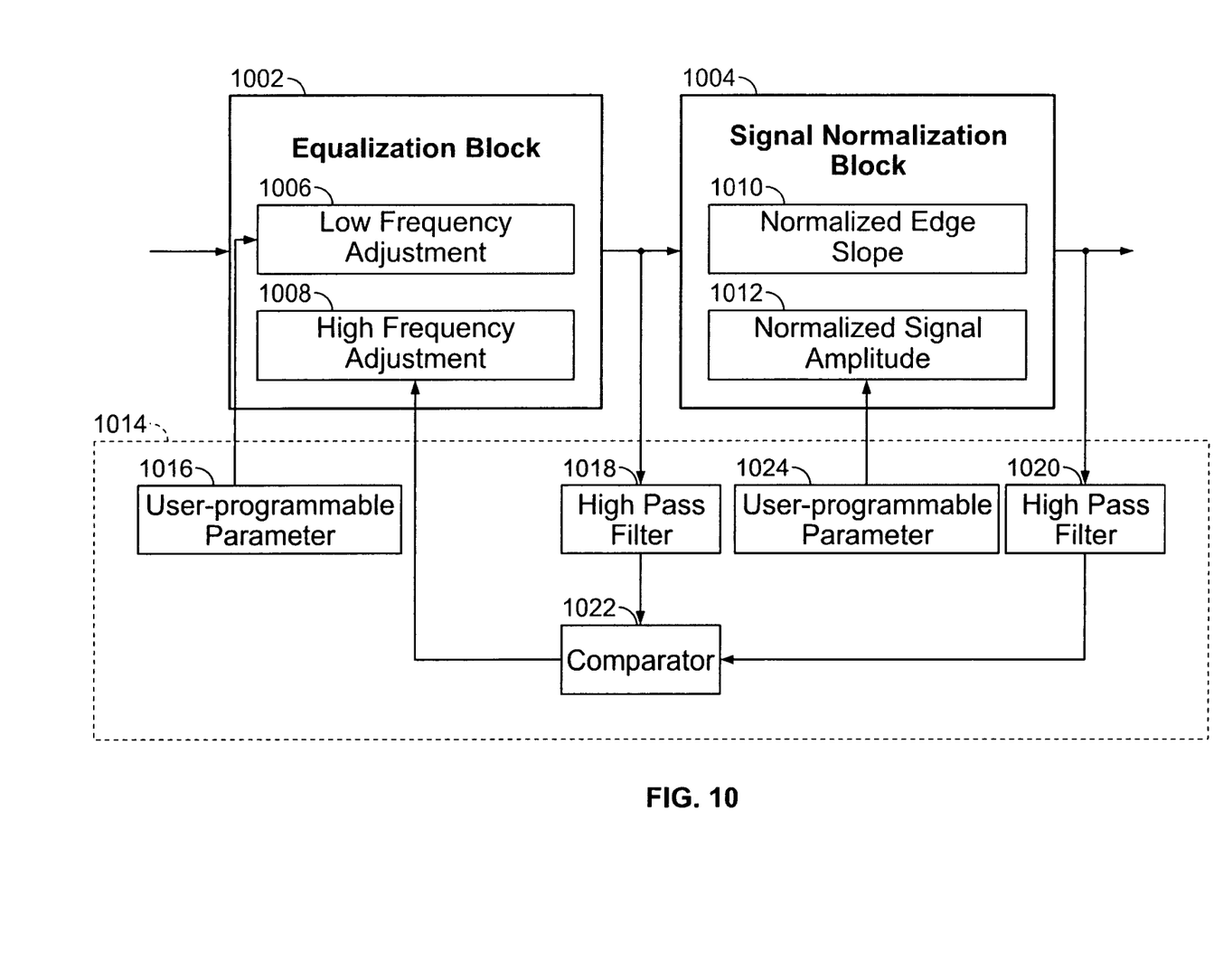
FIG. 10 is a block diagram of one embodiment of a receiver that includes user-programmable parameters.

Referring now to FIG. 10, there is shown one embodiment of a receiver in accordance with one aspect of the invention, in which some aspects of the equalization block and the signal normalization block are controlled by user-programmable parameters. The illustrated receiver includes an equalization block 1002 and a signal normalization block 1004, which were described above herein. The illustrated equalization block 1002 can perform low frequency adjustment 1006 and high frequency adjustment 1008. As previously described herein, the distinction between "high" and "low" frequencies can be based on boundary frequencies, which may can be constant or adjustable. For example, in one embodiment, a "low frequency" can be those frequencies that are below a first predetermined frequency, and a "high frequency" can be those frequencies that are above a second predetermined frequency. The first frequency and the second frequency can be the same frequency or can be different frequencies. In one embodiment, one or more boundary frequencies can correspond to corner frequencies of filters in the receiver circuit.

In the illustrated embodiment, the output of the equalization block 1002 is connected to the signal normalization block 1004, which can receive an equalized signal from the equalization block 1002. The signal normalization block 1004 can convert the equalized signal into a normalized signal. In particular, the signal normalization block 1004 can convert an edge slope of the equalized signal to a normalized edge slope 1010 and can convert a signal amplitude of the equalized signal to a normalized signal amplitude 1012.

As mentioned above herein, the equalization block 1002 and the signal normalization block 1004 are similar. When the equalization block 1002 adjusts the frequency content of a signal, the frequency adjustment can also affect the signal's amplitude or edge slope. Conversely, when the signal normalization block 1004 adjusts a signal's amplitude or edge slope, the adjustment can also affect the signal's frequency content. Therefore, based on this similarity, the operations of the equalization block 1002 and the signal normalization block 1004 can be coordinated or apportioned in different ways to suit different applications and circumstances. This coordination or apportionment can be provided by a control block.

In FIG. 10, the illustrated receiver includes a control block 1014 that controls some aspects of the equalization block 1002 and the signal normalization block 1004. In particular, the illustrated control block 1014 includes a user-programmable parameter 1016 that controls low frequency adjustment 1006 in the equalization block 1002, and a feedback mechanism 1018-1022 that controls high frequency adjustment 1008 in the equalization block 1002. The feedback mechanism 1018-1022 can operate in the same way as described herein in connection with FIGS. 6-9. The control block 1014 also includes a user-programmable parameter 1024 that controls the normalized signal amplitude 1012 in the signal normalization block 1004. Since the normalized signal amplitude 1012 corresponds to low frequency content, adjustment of low frequency content in both the equalization block 1002 and the signal normalization block 1004 are controlled by user-programmable parameters 1016, 1024. The user-programmable parameters 1016, 1024 can be one or more values stored in a memory (not shown), which can be part of the control block 1014 or outside the control block 1014. In one embodiment, the user-programmable parameters can be configured by a user-interface device (not shown) in communication with the user-programmable parameters 1016, 1024. In the equalization block 1002, the user-programmable parameter 1016 can, for example, indicate to the equalization block 1002 a particular range of low frequencies and/or a particular amount of frequency adjustment for those frequencies. In the signal normalization block 1004, the user-programmable parameter 1024 can, for example, indicate to the signal normalization block 1004 the value of the normalized signal amplitude 1012.

The control block 1014 of FIG. 10 has various advantages. One advantage is that a control block in accordance with FIG.

10 includes fewer components than a control block in accordance with FIG. 6. In particular, the control block 1014 of FIG. 10 does not include low pass filters or a low frequency comparator. Therefore, the control block 1014 reduces circuit layout area and power consumption and simplifies the design of the receiver. Additionally, the receiver of FIG. 10 reduces load and thus enhances the bandwidth of the equalization block 1002, while providing stable low-frequency path gain.

Figure 11:
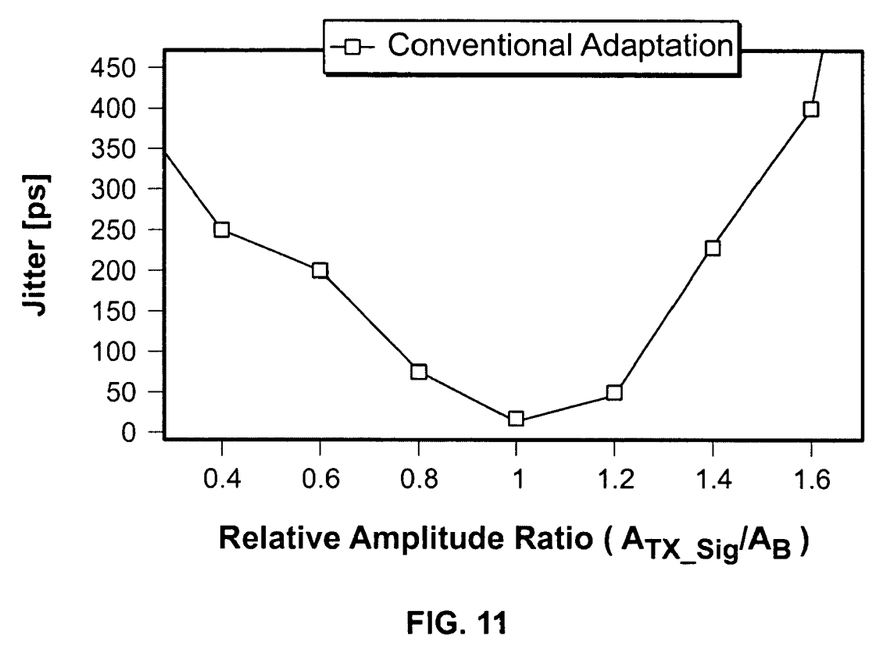
FIG. 11 is a graph of signal jitter based on the ratio of transmit amplitude to normalized signal amplitude.

In one aspect of the invention, the receiver of FIG. 10 can control an amount of jitter present in the normalized signal at the output of the signal normalization block 1004. In particular, the amount of jitter present at the output of the signal normalization block 1004 can depend upon the transmit amplitude of a signal received by the receiver and the normalized signal amplitude 1012 provided by the signal normalization circuit 1004. As used herein, "transmit amplitude" refers to the amplitude of a signal at the time of transmission. FIG. 11 shows a graph of an exemplary relationship between jitter and a ratio of transmit amplitude to normalized signal amplitude. In accordance with one aspect of the invention, the user-programmable parameter 1024 can be configured to establish a normalized signal amplitude 1012 that provides a desired amount of jitter in the normalized signal. In one embodiment, the user configuring the user-programmable parameter 1024 can know the transmit amplitude. In one embodiment, the control block 1014 can know the transmit amplitude (not shown). In one embodiment, the user-programmable parameter 1024 can be configured with or without knowing the jitter relationship (e.g., FIG. 11). In accordance with one aspect of the invention, after the normalized signal amplitude 1012 is configured to provide a desired amount of jitter, the user-programmable parameter 1024 cannot be varied to adjust low frequency content. Therefore, adjustment of low-frequency content can be performed by the equalization block through the user-programmable parameter 1016, which can be varied as needed.

In one aspect of the invention, a control block (not shown) can simultaneously include the control mechanism 606 of FIG. 6 and the control mechanism 1014 of FIG. 10. In one embodiment, the control block can selectively enable one of the control mechanisms (either 606, FIG. 6, or 1014, FIG. 10) based on various considerations. For example, the control block can enable the control mechanism 1014 of FIG. 10 when a channel's (not shown) flat loss and low-frequency loss are well characterized, when the supply voltage (not shown) is well regulated, when temperature variation in the receiver is well monitored, and/or when the low frequency content at the output of the signal normalization block is reasonably stable. In one embodiment, the low frequency content at the output of the signal normalization block can be reasonably stable when an appropriate corner frequency is selected for high pass filters in the control block.

Accordingly, what has been describe thus far are systems and methods for adjusting a signal received from a communication path. A receiver can receive a signal from a communication path that attenuates at least some frequency components of the signal. The receiver can include an equalization block that adjusts at least some of the frequency content of the received signal, a signal normalization block that provides a normalized signal amplitude and/or a normalized edge slope, and a control block. The control block can control the frequency content adjustment in the equalization block and/or the normalized signal amplitude or the normalized edge slope in the signal normalization block. In one embodiment, the control block controls frequency adjustment in the equalization block for high frequencies but not for low frequencies. For low frequency adjustment, the control block controls the normalized signal amplitude in the signal normalization block. In this manner, controlled adjustment for low frequency content is performed in the signal normalization block. In one embodiment, the control block controls frequency adjustment in the equalization block for high frequencies, and user-programmable parameters control low frequency adjustment in the equalization block and the normalized signal amplitude in the signal normalization block. One skilled in the art will appreciate that any embodiment described and/or illustrated herein is exemplary and does not limit the scope of the invention as defined by the following claims.

What is claimed is:

1. Receiver circuitry for adjusting a digital signal, comprising:
   an equalization circuit that provides frequency content adjustment, wherein the equalization circuit adjusts frequency content below a first frequency based, at least in part, on a first user-programmable parameter; and
   a signal normalization circuit that is connected to an output of the equalization circuitry, wherein the signal normalization circuit converts a digital signal amplitude to a normalized signal amplitude, wherein the first frequency is controlled based, at least in part, on the normalized signal amplitude, wherein the signal normalization circuit converts the digital signal amplitude to the normalized signal amplitude based, at least in part, on a second user-programmable parameter.

2. Receiver circuitry for adjusting a digital signal, comprising:
   a first user-programmable parameter and a second user-programmable parameter;
   an equalization circuit that provides frequency content adjustment, wherein the equalization circuit adjusts frequency content below a first frequency based on the first user-programmable parameter and adjusts frequency content above a second frequency;
   a signal normalization circuit that is connected to an output of the equalization circuitry, wherein the signal normalization circuit converts a digital signal amplitude to a normalized signal amplitude, wherein the normalized signal amplitude is based on the second user-programmable parameter; and
   a control circuit that is connected to the equalization circuit, wherein the control circuit controls the frequency content adjustment above the second frequency.

3. The receiver circuitry of claim 2, wherein the control circuit includes a high pass filter connected to the output of the equalization circuit, wherein the second frequency corresponds to a corner frequency of the high pass filter.

4. The receiver circuitry of claim 3, wherein:
   the signal normalization circuit further converts a digital signal edge slope to a normalized edge slope,
   the corner frequency of the high pass filter is adjustable, and
   the control circuit controls the corner frequency of the high pass filter based on the normalized edge slope.

5. The receiver circuitry of claim 2, wherein the control circuit controls the frequency content adjustment above the second frequency in the equalization circuit based on the frequency content above the second frequency at the output of the signal normalization circuit.

6. The receiver circuitry of claim 5, wherein the control circuit comprises:
   a first high pass filter connected to the output of the equalization circuit;

a second high pass filter connected to the output of the signal normalization circuit; and a comparator that compares an output of the first high pass filter to an output of the second high pass filter, and controls the frequency content adjustment above the second frequency in the equalization circuit based on the comparison to cause the high pass filter outputs to be substantially equal.

7. The receiver circuitry of claim 6, wherein the first high pass filter and the second high pass filter have adjustable corner frequencies.

8. The receiver circuitry of claim 7, wherein the signal normalization circuit further converts a digital signal edge slope to a normalized edge slope, and wherein the control circuit controls the corner frequencies based on the normalized edge slope.

9. Receiver circuitry for controlling jitter in a received digital signal, where the received digital signal was transmitted with a particular transmit amplitude, the receiver circuitry comprising:

an equalization circuit that receives the digital signal and adjusts the frequency content of the digital signal; and a signal normalization circuit that is connected to an output of the equalization circuitry, wherein the signal normalization circuit converts a digital signal amplitude to a normalized signal amplitude, wherein the normalized signal amplitude is based on a user-programmable parameter, wherein the user-programmable parameter is configured based on the particular transmit amplitude to provide a desired jitter performance.

10. The receiver circuitry of claim 9, wherein the equalization circuit adjusts frequency content below a first frequency based on a second user-programmable parameter.

11. The receiver circuitry of claim 10, wherein the equalization circuit further adjusts frequency content above a second frequency, the receiver circuitry further comprising:

a control circuit that is connected to the equalization circuit, wherein the control circuit controls the frequency content adjustment above the second frequency.

12. The receiver circuitry of claim 11, wherein the control circuit comprises:

a first high pass filter connected to the output of the equalization circuit;

a second high pass filter connected to an output of the signal normalization circuit; and a comparator that compares an output of the first high pass filter to an output of the second high pass filter, and controls the frequency content adjustment above the second frequency in the equalization circuit based on the comparison to cause the high pass filter outputs to be substantially equal.

13. A method for adjusting a digital signal using receiver circuitry that includes an equalization circuit and a signal normalization circuit, the method comprising:

adjusting frequency content of the digital signal above a first frequency using the equalization circuit; and adjusting frequency content of the digital signal below a second frequency by configuring the equalization circuit and the signal normalization circuit in one of at least two modes, wherein the at least two modes comprise:

a first mode in which the signal normalization circuit is configured to adjust the frequency content below the second frequency based on an output of the equalization circuit, and a second mode in which the equalization circuit and the signal normalization circuit are configured to adjust the frequency content below the second frequency based on respective first and second user-programmable parameters.

14. The method of claim 13, further comprising:

in the first mode, configuring the equalization circuit to adjust frequency content of the digital signal only above the first frequency.

15. The method of claim 13, further comprising:

in the second mode, configuring the second user-programmable parameter to provide a particular jitter performance at an output of the signal normalization circuit.

16. The method of claim 15, wherein configuring the second user-programmable parameter includes configuring the second user-programmable parameter based on a transmit amplitude of the digital signal.

17. The receiver circuitry of claim 1, wherein the equalization circuit further adjusts frequency content above a second frequency.

18. The receiver circuitry of claim 17 further comprising a control circuit that controls the second frequency based, at least in part, on a normalized edge slope provided by the signal normalization circuit.

19. Receiver circuitry for adjusting a digital signal, comprising:

an equalization circuit that provides frequency content adjustment, wherein the equalization circuit adjusts frequency content below a first frequency based, at least in part, on a first user-programmable parameter; and a signal normalization circuit that is connected to an output of the equalization circuitry, wherein the signal normalization circuit converts a digital signal amplitude to a normalized signal amplitude, wherein the first frequency is controlled based, at least in part, on the normalized signal amplitude, wherein the signal normalization circuit further converts a digital edge slope to a normalized edge slope, and wherein the normalized signal amplitude and the normalized edge slope are separately controllable.

* * * * *